US011113074B2

(12) United States Patent
Gorecha et al.

(10) Patent No.: US 11,113,074 B2
(45) Date of Patent: Sep. 7, 2021

(54) SYSTEM AND METHOD FOR MODEM-DIRECTED APPLICATION PROCESSOR BOOT FLOW

(71) Applicant: QUALCOMM INCORPORATED, San Diego, CA (US)

(72) Inventors: Saurabh Gorecha, Hyderabad (IN); Naresh Kumar Sharma, Hyderabad (IN); Pravin Kumar, Faridabad (IN); Dexter Tamio Chun, San Diego, CA (US); Christopher Kong Yee Chun, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/688,978

(22) Filed: Nov. 19, 2019

(65) Prior Publication Data
US 2020/0409721 A1  Dec. 31, 2020

(30) Foreign Application Priority Data

Jun. 28, 2019 (IN) .............................. 201921025967

(51) Int. Cl.
*G06F 9/4401* (2018.01)
*H04L 9/32* (2006.01)
(Continued)

(52) U.S. Cl.
CPC .......... *G06F 9/4418* (2013.01); *G06F 9/4403* (2013.01); *G06F 9/4812* (2013.01);
(Continued)

(58) Field of Classification Search
CPC ....... Y02D 10/00; G06F 13/28; G06F 1/3203; G06F 1/3287; G06F 1/3275; G06F 1/3237; G06F 1/324; G06F 12/1408; G06F 1/3296; G06F 1/26; G06F 1/3243; G06F 2212/1028; G06F 21/575; G06F 9/4401; G06F 13/24; G06F 1/3234; G06F 1/3253
(Continued)

(56) References Cited

U.S. PATENT DOCUMENTS 8,347,012 B2   1/2013   Goss et al.
9,971,397 B2   5/2018   Sanghi et al.
(Continued)

FOREIGN PATENT DOCUMENTS

WO   WO2018223100   12/2018

OTHER PUBLICATIONS

International Search Report and Written Opinion—PCT/US2020/030299—ISAEPO—dated Jul. 23, 2020.

*Primary Examiner* — Faisal M Zaman
(74) *Attorney, Agent, or Firm* — Qualcomm Incorporated

(57) ABSTRACT

Various embodiments of methods and systems for a modem-directed application processor boot flow in a portable computing device ("PCD") are disclosed. An exemplary method includes an application processor that transitions into an idle state, such as a WFI state, for durations of time during a boot sequence that coincide with processing by a DMA engine and/or crypto engine. That is, the application processor may "sleep" while the DMA engine and/or crypto engine process workloads in response to instructions they received from the application processor.

48 Claims, 5 Drawing Sheets

(51) Int. Cl.
*G06F 13/28* (2006.01)
*H04L 9/06* (2006.01)
*G06F 9/48* (2006.01)

(52) U.S. Cl.
CPC ............ *G06F 13/28* (2013.01); *H04L 9/0643* (2013.01); *H04L 9/3247* (2013.01)

(58) Field of Classification Search
USPC .......... 710/22, 308, 260; 713/320, 323, 300, 713/322, 324
See application file for complete search history.

(56) References Cited

U.S. PATENT DOCUMENTS

| | | | |
|---|---|---|---|
| 10,152,599 B2 | 12/2018 | Hildebrand | |
| 2001/0039612 A1* | 11/2001 | Lee | G06F 9/4406 713/2 |
| 2003/0018923 A1* | 1/2003 | Kumar | G06F 1/3203 713/320 |
| 2004/0002381 A1* | 1/2004 | Alcorn | A63F 13/08 463/37 |
| 2004/0221150 A1* | 11/2004 | Maynard | G06F 9/4403 713/2 |
| 2006/0036864 A1* | 2/2006 | Parulski | H04N 1/4486 713/176 |
| 2008/0147993 A1* | 6/2008 | Kaneko | G06T 1/20 711/147 |
| 2009/0164816 A1* | 6/2009 | Yasuda | H04L 12/10 713/320 |
| 2009/0204831 A1* | 8/2009 | Cousson | G06F 1/324 713/322 |
| 2009/0242644 A1* | 10/2009 | Madej | G06K 7/10732 235/462.41 |
| 2011/0066837 A1* | 3/2011 | Lee | G06F 13/387 713/2 |
| 2011/0072118 A1* | 3/2011 | Day | G06F 9/4411 709/222 |
| 2011/0080414 A1* | 4/2011 | Wang | G06K 7/1413 345/502 |
| 2013/0027413 A1 | 1/2013 | Jayavant et al. | |
| 2014/0022605 A1* | 1/2014 | Shimizu | H04N 1/00037 358/449 |
| 2014/0211979 A1* | 7/2014 | Kawazu | G06T 1/0028 382/100 |
| 2014/0281466 A1* | 9/2014 | Samuel | G06F 9/441 713/2 |
| 2015/0355705 A1* | 12/2015 | Weissmann | G06F 1/3287 713/322 |
| 2016/0259650 A1* | 9/2016 | Lewis | H04W 12/50 |
| 2017/0177293 A1* | 6/2017 | Krishnakumar | H04L 65/4069 |
| 2017/0371811 A1* | 12/2017 | Noyes | G06F 9/4498 |
| 2018/0183573 A1 | 6/2018 | Ghosh et al. | |
| 2018/0204006 A1 | 7/2018 | Barr et al. | |
| 2019/0042754 A1* | 2/2019 | Jreij | G06F 21/575 |
| 2019/0042765 A1 | 2/2019 | Chung et al. | |
| 2020/0026339 A1* | 1/2020 | Sebastian | G06F 1/3209 |

* cited by examiner

SYSTEM AND METHOD FOR MODEM-DIRECTED APPLICATION PROCESSOR BOOT FLOW

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

PCDs commonly include an application processor ("AP") that is comprised within a complex system termed a mobile chipset or system on a chip ("SoC"). The AP is generally the overall supervisor of the functions delivered by the SoC and, as such, remains awake and consuming power during almost any activity of the SoC. For example, in systems and methods known in the art, when the modem of a SoC receives a memory page that requires some kind of processing attention, the modem will signal the AP to take over processing of the memory page. At this point, the AP is booted via its executing program and will remain in constant communication with the static random-access memory ("SRAM") or dynamic random-access memory ("DRAM") (i.e., the memory component) until the page is processed.

The AP, which may be a multi-core processing component, consumes significant amounts of power when it stays up and running at a relatively high frequency, such as when the AP is supervising a boot flow. As such, power savings in the SoC may be realized if the AP could be powered down, or otherwise given the opportunity to transition from an active processing state to an idle state (sometimes termed a "sleep state" or "sleep mode") that consumes less power. Similarly, further power savings may be realized when the power supplied to the DRAM associated with an AP is lowered or removed. Systems and methods in the prior art have failed to find ways to exploit these areas of power savings during a boot sequence.

Accordingly, what is needed in the art is a method and system for removing or minimizing the need to leverage an AP and its associated DRAM during a boot sequence. More specifically, what is needed in the art is a system and method for a modem-directed application processor boot flow.

SUMMARY OF THE DISCLOSURE

Various embodiments of methods and systems for a modem-directed application processor boot flow in a portable computing device ("PCD") are disclosed. An exemplary method includes an application processor, after receiving notification from a modem that an image in memory requires some action, initializing a direct memory access ("DMA") engine and a crypto engine. The DMA engine and the crypto engine may be associated with a flash controller for an external, non-volatile memory device (e.g., a flash memory, electrically erasable programmable read-only memory ("EEPROM"), magnetoresistive random-access memory ("MRAM"), phase-change random-access memory ("PRAM"), ferroelectric random-access memory ("FeRAM"), carbon nanotube RAM ("NRAM"), etc.). The DMA engine is configured to read data from the memory component and the crypto engine is configured to calculate a hash according to a predetermined hash function. The application processor instructs the DMA engine to read metadata and data segments associated with the image. The application processor also instructs the crypto engine to calculate hash values associated with the metadata and data segments. And, the application processor transitions into an idle state, such as a WFI state, for durations of time coinciding with processing by the DMA engine and/or crypto engine. That is, the application processor may "sleep" while the DMA engine and/or crypto engine process workloads in response to instructions they received from the application processor. Advantageously, when the application processor is in the idle state it consumes less power than when in an active processing state and so embodiments of the solution realize power savings over prior art methods that keep the application processor in an active state throughout a boot process.

An exemplary embodiment of the solution in the form of a computer system for modem-directed application processor boot flow in a portable computing device ("PCD") that comprises an application processor. The application processor is configured to initialize a direct memory access ("DMA") engine that is configured to read data from a memory component, initialize a crypto engine that is configured to calculate a hash according to a predetermined hash function, instruct the DMA engine to read metadata and data segments associated with an image stored in a memory component, instruct the crypto engine to calculate hash values associated with the metadata and data segments, and transition into an idle state for durations of time coinciding with processing by the DMA engine and/or crypto engine.

Another exemplary embodiment of the solution in the form of a computer system for a modem-directed application processor boot flow in a portable computing device ("PCD") comprises means for initializing a direct memory access ("DMA") engine that is configured to read data from a memory component, means for initializing a crypto engine that is configured to calculate a hash according to a predetermined hash function, means for instructing the DMA engine to read metadata and data segments associated with an image stored in a memory component, means for instructing the crypto engine to calculate hash values associated with the metadata and data segments, and means for transitioning an application processor into an idle state for durations of time coinciding with processing by the DMA engine and/or crypto engine.

Another exemplary embodiment of the solution in the form of a computer program product comprises a computer usable medium having a computer readable program code embodied therein that is adapted to be executed to implement a method for a modem-directed application processor boot flow in a portable computing device ("PCD"), said method comprising initializing a direct memory access ("DMA") engine that is configured to read data from a memory component, initializing a crypto engine that is configured to calculate a hash according to a predetermined hash function, instructing the DMA engine to read metadata and data segments associated with an image stored in a memory component, instructing the crypto engine to calculate hash values associated with the metadata and data segments, and transitioning an application processor into an idle state for durations of time coinciding with processing by the DMA engine and/or crypto engine.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
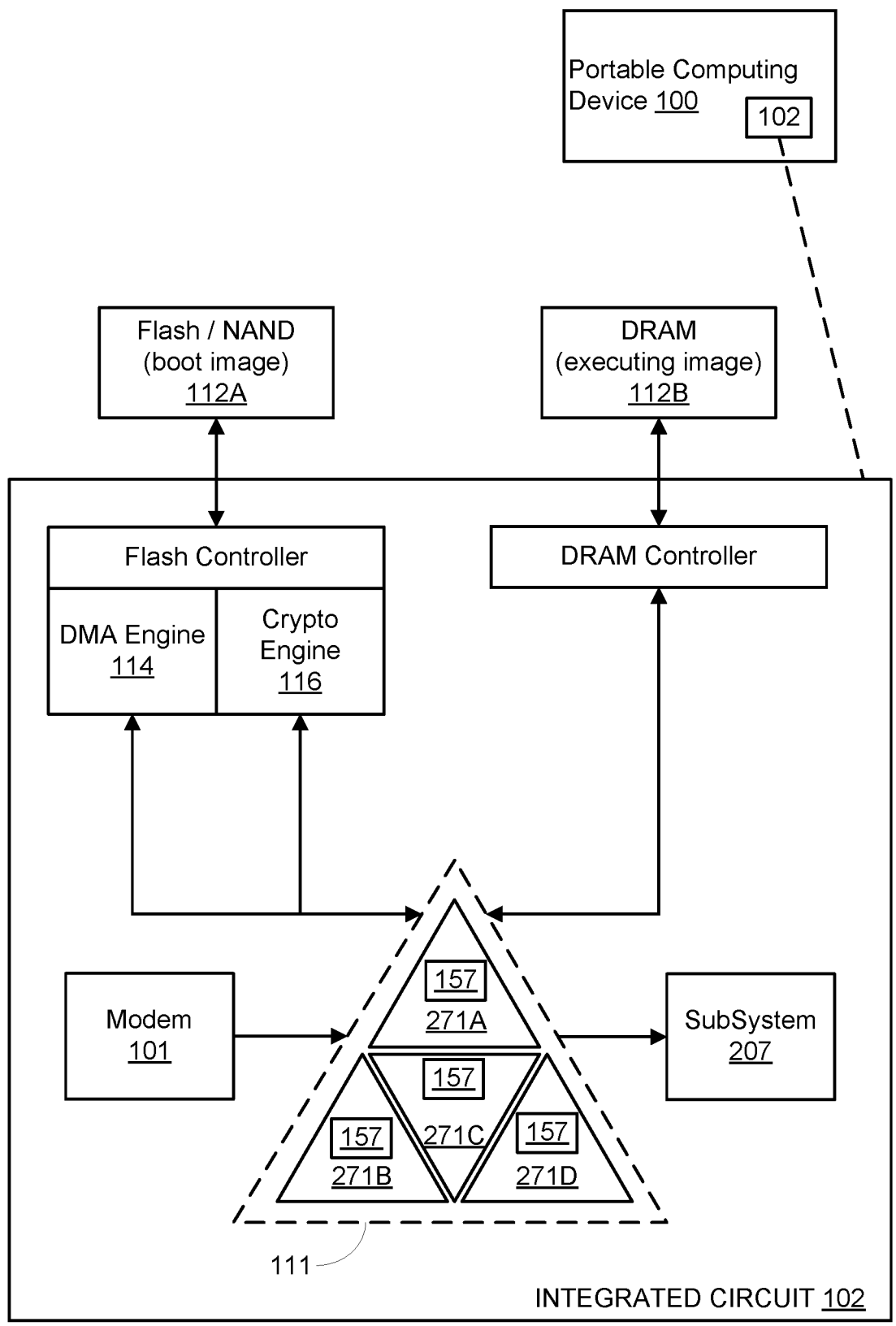
FIG. 1 is a functional block diagram illustrating an embodiment of an on-chip system for executing a modem-directed application processor boot flow.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "processing engine," "application processor" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "application processor ("AP")," "chip" and "chipset" are non-limiting examples of processing components that may reside in a PCD and are used interchangeably except when otherwise indicated. Moreover, as distinguished in this description, a CPU, DSP, AP or a chip or chipset may be comprised of one or more distinct processing components generally referred to herein as "core(s)."

In this description, reference to "external memory device" and the like refers to a broader class of non-volatile (i.e., retains its data after power is removed) programmable memory and will not limit the scope of the solutions disclosed. As such, it will be understood that use of the terms envisions any programmable read-only memory or field programmable non-volatile memory suitable for a given application of a solution such as, but not limited to, embedded multimedia card ("eMMC") memory, EEPROM, flash memory, etc.

In this description, the term "portable computing device" ("PCD") is used to describe any device operating on a limited capacity power supply, such as a battery. It will be understood, therefore, that a PCD may be any device that falls within such a definition and so would include fixed location devices such as, but not limited to, a gas station pump, a utility meter (i.e. a natural gas meter; a water meter; an electrical consumption meter; etc.), a device that is part of a security system, an entire security system, etc. A PCD may be characterized as an Internet of Things (IoT) device as will be described more fully in connection with FIG. 5.

Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a tablet, a smartbook or reader, a media player, a combination of the aforementioned devices, a laptop computer with a wireless connection, among others.

In this description, the term "DMA engine" refers to a direct memory access component of the SoC that allows certain hardware or subsystems, such as a modem for example, to access system and/or peripheral memory independently from the central processing unit ("CPU") or application processor.

In this description, the term "crypto engine" refers to any processing component configured for execution of cryptographic operations or functions in response to a request from an application processor or the like.

In this description, the term "non-blocking acknowledgement" indicates an acknowledgement signal from one processing component to another wherein the two components are engaged in a software handshake. As such, the current function of the first component is not blocked by the pending acknowledgement from the second component, as would be understood by one of ordinary skill in the art. Within the context of the solution, the term "non-blocking acknowledgement" envisions the scenario wherein a first component continues to process a workload until there is acknowledgement from a second component for the first component to change its action. It is envisioned, however, that a first component's recognition of a non-blocking acknowledgement from another component may not dictate that the first component change its course of action, depending on recognition of various other predetermined factors. As a non-limiting example, in the proposed solution, while an application subsystem (APSS) is waiting for receipt of an interrupt (i.e., a non-blocking acknowledgement) from a DMA engine to start loading a next segment, the APSS may continue to work in coordination with a crypto engine or, alternatively, enter into a low power consumption sleep state. If the APSS requires some execution (e.g. initiating the crypto operation) instead of sleep, that may also be performed while it awaits receipt of a non-blocking acknowledgement. Advantageously, and as will become better understood from the following description and associated illustrations, this helps in parallelization of DMA engine operation and crypto engine operation. By contrast, if the acknowledgement is of a blocking type for APSS (as opposed to a non-blocking type as described above), such as has been used in the prior art, advantageous parallelization of the DMA and crypto engines may not be achievable.

In this description, the term "latency" is generally used to reference the time it takes for a given processing component to transition from a certain idle state to an active state for processing a workload, such as a boot sequence. Multiple idle states may be available for a given exemplary core and distinguished one from the other based on the latency and the leakage power of the core for each idle state. Generally speaking, the higher the latency associated with a certain idle state the lower the leakage rate (i.e., the lower the power consumption). Accordingly, as one of ordinary skill in the art will understand, an idle state associated with a high latency may afford better power savings as contrasted to an idle state associated with a high leakage rate which may afford relatively quicker response to a boot sequence workload.

In this description, the terms "bootstrapping," "boot," "boot sequence," and the like are meant to refer to the set of operations that an application processor performs at the direction of an executing image when the AP is powered on, or resumes from power saving modes, including, but not limited to, loading the operating system, subsequent images corresponding to different scenarios such as factory provision or normal boot up, and preparing the various PCD components for use. Terms such as "boot phase" and "boot stage" are meant to refer to a portion of an entire boot sequence which one of ordinary skill in the art understands to be collectively comprised of a series of temporally executed boot stages. A boot sequence may begin with a first-stage boot loader ("FSBL") stage followed by a second-stage boot loader ("SSBL") stage, a third-stage boot loader ("TSBL") stage and so on. Notably, exemplary embodiments of the solution are described within the context of responding to a modem request to an AP to conduct a boot sequence and execute some action in response to an image retrieved from memory; however, it is envisioned that certain embodiments of the solutions may be applicable to AP supervised boot sequences associated with other instruction and/or data sets stored in non-volatile memory.

For convenience of describing the exemplary embodiments of the solution, this description refers to a "wait for interrupt" ("WFI") idle state, although it is envisioned that certain embodiments of the solution may be configured to take advantage of other processor idle states such as, but not limited to, a retention idle state and/or a power collapse idle state. Even so, embodiments of the systems and methods are not limited to just the three idle states mentioned above or any particular combination of idle states. As one of ordinary skill in the art will understand, any number of idle states may be available and employed in a PCD, each such state offering varying latency levels and power savings levels.

By transitioning a memory component like DRAM and/or a core or cores of an AP from an active processing state to an idle state during a boot sequence, thereby removing power from power rails and allowing content stored in the memory component(s) to be lost, embodiments of the solution advantageously enable power consumption associated with the active state of the AP and/or memory component to be avoided. As will become clearer from a review of the figures and the associated detailed descriptions below, an AP may be strategically transitioned in and out of a WFI state during a boot sequence by working in parallel with other SoC components, such as a DMA engine and a crypto engine, to handle various steps of the boot sequence to bring a subsystem of the SoC out of reset. In doing so, the AP and its associated memory component may require cold boot/ authentication themselves multiple times during a boot sequence of a subsystem on the SoC in order to supervise certain actions in the boot sequence.

For embodiments of the solution, boot and authentication of the AP and its associated memory occur frequently (e.g. many times an hour), yielding maximum power savings during supervisory of a boot sequence for a subsystem. The AP may be booted/authenticated often by the modem throughout the boot sequence. After the AP does its portion of the work in the boot sequence, it shuts down to the absolute lowest power state available (e.g., power rail removed, SRAM lost content, DRAM lost content), after which the only way to return the AP to service for the subsystem boot sequence is by boot/authentication of the AP and its memory.

When a processing core enters a WFI idle state, its processor clock is stopped, or "gated off," until an interrupt or debug event occurs (in this description, the interrupt event is referred to as a "wakeup interrupt" or "wakeup"). As such, according to embodiments of the present solution, the AP core(s) is no longer in an active state for processing a boot sequence workload (thus saving power consumption) but remains ready to quickly transition back to an active state in the event that an interrupt is detected. Even though the core is not consuming power for processing a workload when it is in the WFI idle state, voltage is likely still being supplied to the core and a measurable current inevitably remains on the power supply rail of the core in the form of a leakage current. Notably, the leakage current can be directly correlated with the temperature of the core (i.e., the junction temperature) and therefore one of ordinary skill in the art will recognize that measurement of the core's temperature can be used to calculate its ongoing rate of power consumption (regardless of the particular idle state in which the core may be).

Although exemplary embodiments of the solution are described within the context of transitioning an AP in and out of a WFI state during a boot sequence, it is envisioned that some embodiments may leverage idle states other than the WFI idle state. For example, certain embodiments may transition an AP in and out of a retention state during a boot sequence. The retention idle state is similar to the WFI idle state in that a processing core in the retention state has been clock gated. Further, though, when in the retention state the power voltage supplied to the processing core is also reduced. An advantage of the retention state over the WFI state is that less leakage current is associated with the retention state and, therefore, power savings in the retention state is improved over the WFI state. Notably, however, the latency time for the processor to return to an active state from the retention idle state is increased as compared to transitioning from the WFI state.

Yet another example of an idle state that may be leveraged by embodiments of the solution is a power collapse idle state. As compared to the retention idle state, a processing core that enters the power collapse idle state is fully clocked and all power is removed from its power supply rail. Consequently, the power savings associated with the power collapse idle state is improved over the WFI and retention states; however, the latency associated with the power collapse idle state is the longest in duration of all three exemplary states described herein because the core must go through a warm boot sequence in order to transition back to an active state.

Again, the general description of, and reference to, the above three idle states that may be available to an exemplary processing component are offered for illustrative purposes only and are not meant to imply or suggest that embodiments of the systems and methods are only applicable to any one or more of these three idle states. It is envisioned that any number of idle states may be leveraged by embodiments of the systems and methods. Some idle states may clock gate a processor and/or reduce its power supply via software whereas other idle states may do so via hardware. Similarly, in addition to clock gating and reducing power to a processing component such as an application processor, some idle states may further turn off memory, drivers, bus hardware or the like. Memory components such as SRAM may enter a retention state, where the volatile contents in the memory array are retained, or may enter a partial power-down state where only a fraction of the array contents are retained or may enter a full power-down state where the entire array contents are lost and must be restored prior to use. Memory components such as DRAM may enter a retention state, where the volatile contents in the memory array are periodically refreshed, or may enter a partial power-down state where only a fraction of the array contents are refreshed, or may enter a full power-down state where the entire array contents are lost and must be restored prior to use. Generally, though, the more extreme the measures taken in a given idle state to conserve power, the longer it will take for an AP, memory, drivers, bus hardware that is in that idle state to return to an active processing state.

Notably, it is envisioned that not all processing cores will exhibit equivalent power savings and latencies when operating at a given temperature and in a given idle state. As one of ordinary skill in the art will recognize, performance characteristics of various processing cores when in the same idle state and at the same operating temperature may differ for any number of reasons including, but not limited to, differing levels of silicon, design variations, etc. Moreover, one of ordinary skill in the art will recognize that the performance characteristics associated with any given processing core may vary in relation with the operating temperature of that processing core, the power supplied to that processing component according to the idle state, etc. And so, it is envisioned that embodiments of the solution may select and implement an idle state for a given AP in view of its active junction temperature and latency characteristics.

For instance, consider an exemplary heterogeneous multi-core application processor which may include a number of different processing cores generally ranging in performance capacities from low to high (notably, one of ordinary skill in the art will recognize that an exemplary heterogeneous multi-processor system on a chip ("SoC") which may include a number of different processing components, each containing one or more cores, may also be considered). As would be understood by one of ordinary skill in the art, a low capacity to medium capacity processing core within the heterogeneous AP will exhibit a lower power leakage rate in a given idle state, and consequently a lower rate of power consumption and thermal energy generation, than a processing core having a relatively high performance capacity and in the same idle state. For these reasons, one of ordinary skill in the art will recognize that, even though a high capacity core may be the most desirable for processing a given boot sequence for a page, a low capacity core may be more desirable in certain scenarios for designation to a WFI idle state as its lower leakage rate may not cause an overall power budget to be exceeded.

Embodiments of the solution realize power savings in a SoC by transitioning an application processor and/or its associated SRAM and/or DRAM memory to an idle state at various times and durations of a boot sequence. Transitioning an application processor and/or its SRAM and/or DRAM memory in and out of an idle processing state during a boot flow is unavailable in standard boot flows known in the art. For example, in prior art boot sequences on a typical SoC, when a modem receives a page from memory that requires some sort of workload processing or action, the modem will command the AP to boot and take over processing of the page. The AP remains up and running, often consuming copious amounts of power, from that point forward while sequentially loading and authenticating multiple images, one after the other.

An exemplary traditional boot flow in this vein begins with the boot core of the AP powering on and initializing the mandatory peripheral components such as, but not limited to, double data rate ("DDR") memory, internal memory ("IMEM"), pseudo-internal memory ("PIMEM"), eMMC, not-and ("NAND") memory, etc. Once the peripherals are initialized, the AP starts loading the images from secondary memory storage which includes reading metadata for each image and sending it for secure authorization from a trusted zone. If a signature validation of the metadata is successful, i.e. the metadata is successfully validated via decryption using a predefined key, the AP begins reading segments of an image, passing each to the trusted zone for integrity checks. The AP works with a crypto engine to calculate a hash and verify the integrity with the metadata before writing the trusted image into DRAM. Notably, the traditional boot flow requires that the AP, and the DRAM, be powered continuously and minimally or never entering an idle state until image validation is complete.

As will become better understood from the following description and associated figures, embodiments of the solution provide for a modem-directed boot flow that allows opportunity for the AP and/or the DRAM to be powered down into an idle state during strategic points in the novel boot sequence. In this way, embodiments of the solution may conserve power that would otherwise be consumed by an AP core and DRAM executing a traditional boot flow.

FIG. 1 is a functional block diagram illustrating an embodiment of an on-chip system 102 for executing a modem-directed application processor boot flow, the on-chip system 102 being included in a PCD 100. As can be seen in the FIG. 1 illustration, a modem 101 is in communication with a multi-core 271 application processor 111. The AP 111 shown in the illustration includes four cores 271A, 271B, 271C, 271D, however, it will be understood that an AP 111 is not limited to any specific number of cores 271. Each core may have associated with it a temperature sensor 157 for monitoring thermal energy generation by the respective core, as more specifically described relative to the FIG. 2 illustration.

The application processor 111 may be operable to communicate with a subsystem 207 in need of reset, i.e., the AP 111 may be operable to execute a boot sequence for the subsystem 207. The AP 111 is also in communication with a flash controller and its associated DMA engine 114 and crypto engine 116. The flash controller controls and manages access to data images stored in external memory (e.g., a boot image), such as Flash/NAND memory 112A. Further, the AP 111 may also be in communication with a DRAM memory 112B, by and through a DRAM controller, as would be understood by one of ordinary skill in the art. The DRAM 112B may contain an executing image, as would be understood by one of ordinary skill in the art. As shown in the FIG. 1 illustration, both the Flash/NAND memory 112A and the DRAM memory 112B are located on a SOC system 102, however, it is envisioned that any of the Flash/NAND memory 112A and the DRAM memory 112B may be located outside of SOC system 102. As will become better understood from subsequent figures and their related description, the SoC system 102 illustrated in FIG. 1 may be configured and operable to executed a boot sequence for subsystem 207 using a modem-directed approach that allows for the AP 111 to transition in and out of an idle state, such as a WFI state, as needed.

Figure 2:
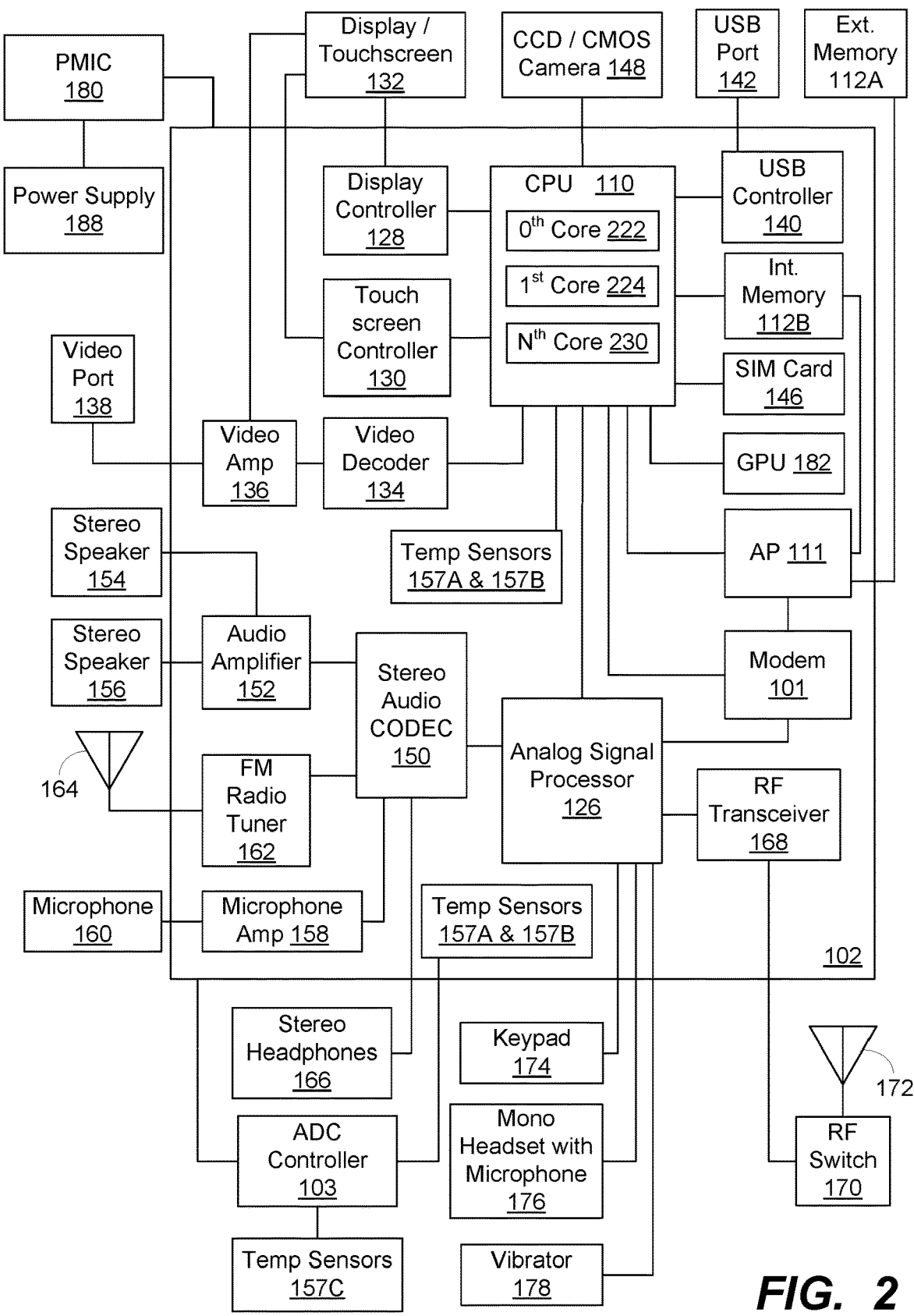
FIG. 2 is a functional block diagram of an exemplary, non-limiting aspect of a PCD in the form of a wireless telephone for implementing methods and systems for modem-directed application processor boot flow.

Turning now to FIG. 2, illustrated is a functional block diagram of an exemplary, non-limiting aspect of a PCD in the form of a wireless telephone for implementing methods and systems for modem-directed application processor boot flows. As shown, the PCD 100 includes an on-chip system 102 that includes a heterogeneous, multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different maximum voltage frequencies, exhibit different quiescent supply current ("IDDq") leakage rates at given temperatures and operating states, have different latencies for transitioning from a given idle operating state to an active state, etc.

In general, the modem 101 may be responsible for monitoring page requests requiring action and directing the AP 111, which also may be a heterogeneous multi-core processor, to initiate a boot sequence during which it transitions in and out of a WFI state in order to conserve energy consumption. In some embodiments, the AP 111 may receive temperature data from a monitor module (not depicted in the FIG. 2 illustration), as well as other condition indicators, and use the data to determine the impact on latencies and power consumption that may result from transitioning one or more of its cores to a different operating state during the boot sequence.

The CPU 110 communicates with multiple operational sensors (e.g., temperature sensors 157) and components distributed throughout the on-chip system 102 of the PCD 100, such as with the modem 101.

As illustrated in FIG. 2, a display controller 128 and a touch screen controller 130 are coupled to the CPU 110. A touch screen display 132 external to the on-chip system 102 is coupled to the display controller 128 and the touch screen controller 130. PCD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the multi-core central processing unit ("CPU") 110. A video amplifier 136 is coupled to the video decoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 (on-chip DRAM 112B and off-chip Flash 112A) and a subscriber identity module (SIM) card 146 may also be coupled to the CPU 110 and/or AP 111. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 via a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip temperature sensors 157A and 157B as well as one or more external, off-chip temperature sensors 157C. The on-chip temperature sensors 157A, 157B may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The temperature sensors 157 may produce a voltage drop that is converted to digital signals with an analog-to-digital converter ("ADC") controller 103. However, other types of temperature sensors 157 may be employed without departing from the scope of the invention.

The temperature sensors 157, in addition to being controlled and monitored by an ADC controller 103, may also be controlled and monitored by one or more modem 101 and/or monitor module(s). The modem 101 and/or monitor module(s) may comprise software which is executed by the CPU 110. However, the modem 101 and/or monitor module(s) may also be formed from hardware and/or firmware without departing from the scope of the invention.

Returning to FIG. 2, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157C, PMIC 180, Flash 112A, the power supply 188 and the ADC controller 103 are external to the on-chip system 102. However, it should be understood that the modem 101 and AP 111 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112. The processors 110, 111, 126, the modem 101, the DMA engine 114 and crypto engine 116 (not shown in FIG. 2), the memory controllers and associated memory 112, the instructions stored therein, or a combination thereof may serve as a means for performing one or more of the method steps described herein.

Figure 3:
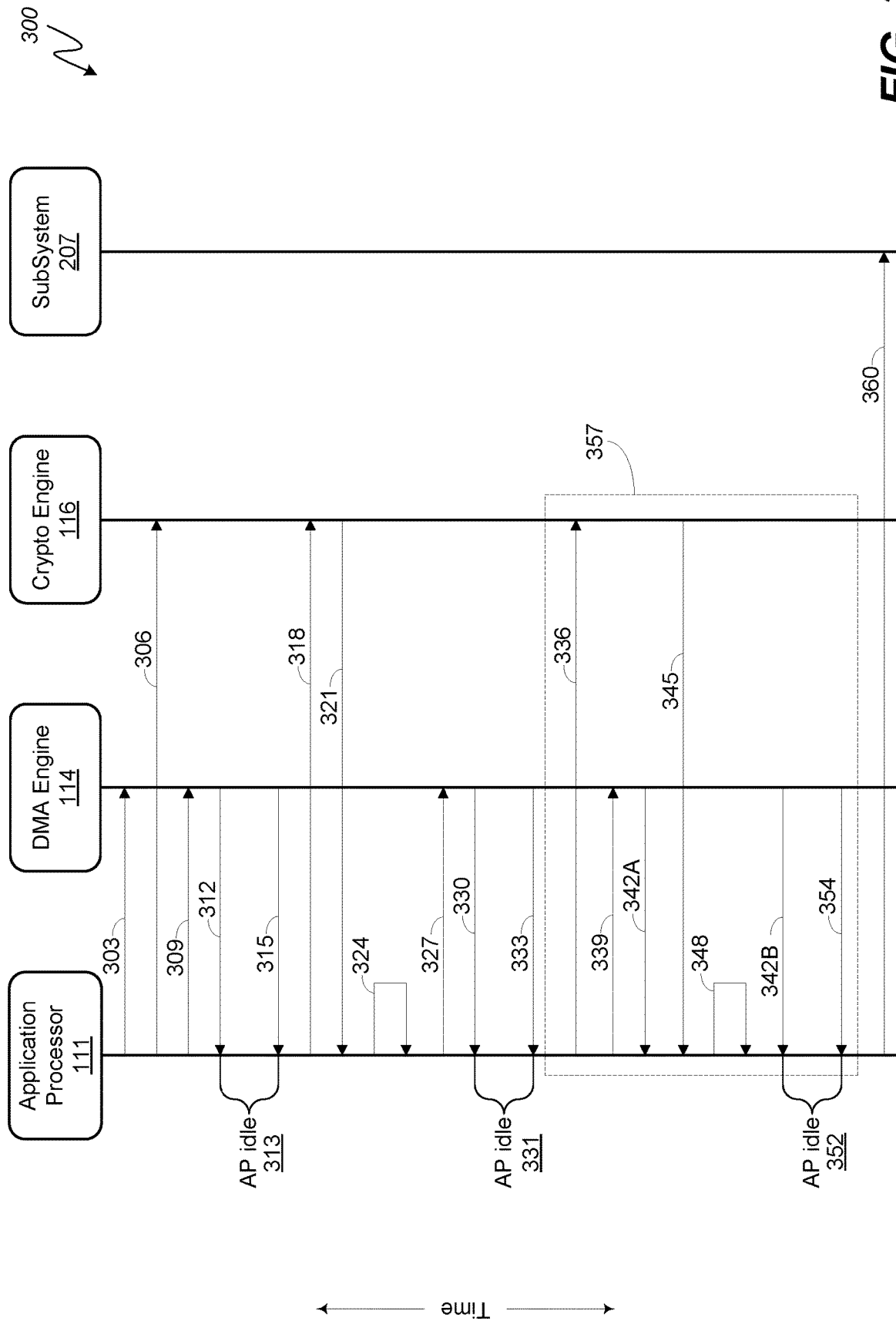
FIG. 3 is a sequence diagram illustrating an exemplary embodiment of a method for modem-directed application processor boot flow according to the solution.

FIG. 3 is a sequence diagram illustrating an exemplary embodiment of a method 300 for modem-directed application processor boot flow according to the solution. Beginning at action 303, the AP 111, in response to a power on reset communication from the modem 101, initializes DMA engine 114 and, at action 306, initializes crypto engine 116. As would be understood by one of ordinary skill in the art, actions 303, 306 may occur essentially simultaneously, one after the other, in either order. That is, action 303 may immediately precede action 306 or, in the alternative, action 306 may immediately precede action 303.

With DMA engine 114 and crypto engine 116 initialized, the AP 111 may take action 309 and trigger DMA engine 114 to read metadata associated with a particular image stored in Flash 112A. In response, the DMA engine 114 may take action 312 and return an acknowledgement (e.g., a non-blocking acknowledgement) to AP 111. Advantageously, the AP 111 (and its associated memory component, DRAM and/or SRAM for example) may enter a first WFI state 313 to conserve power consumption as the DMA engine 114 reads the metadata. The AP 111 may remain in the first WFI state 313 until at action 315 it receives a wakeup interrupt from DMA engine 114. Notably, reference in this description to the AP 111 entering and/or remaining in a WFI state, or any retention or power collapse state, will be understood to mean that not only the AP 111 is in the WFI state but also, in some embodiments, any memory component associated with the AP 111. Removing or lowering power from the rails used to supply power to the AP 111 and/or its associated memory component 112 will advantageously conserve power consumption on the SoC.

In response to the wakeup interrupt 315, the AP 111 may transition out of the WFI state and back to an active processing state to take action 318 and instruct crypto engine 116 to calculate a hash associated with the metadata. The crypto engine 116 may calculate the hash and return it to AP 111 via action 321. The AP 111 may then validate the hash and signature associated with the metadata (action 324) and then initiate DMA engine 114 to read a first segment of data from the image (action 327). Next, DMA engine 114 may respond with action 330 acknowledging the AP 111 request, similar to previously described action 312. Advantageously, the AP 111 may enter a second WFI state 331 to conserve power consumption as the DMA engine 114 reads the first segment of the image. The AP 111 may remain in the WFI state 331 until at action 333 it receives a wakeup interrupt from DMA engine 114.

In response to the wakeup interrupt 333, the AP 111 may transition out of the WFI state and back to an active processing state to take action 336 and instruct crypto engine 116 to calculate the hash for the first data segment of the image. Then, the AP 111 may take action 339 and initiate the DMA engine 114 to begin its read of a next data segment of the image. The DMA engine 114 may respond with action 342 acknowledging the request to read the next data segment (shown in FIG. 3 illustration as action 342A). Notably, the AP 111 makes its instructions to (action 339), and receives its non-blocking acknowledgement from (action 342), the DMA engine 114 while crypto engine 116 is calculating a hash (according to a hash function, as would be understood by one of ordinary skill in the art) in response to previous action 336 from AP 111.

At action 345, the crypto engine 116 has completed its hash calculation and returns it to the AP 111 at action 345, similar to previous action 321. The AP 111 may then validate the hash and signature associated with the first segment of the image (action 348). Next, because the AP 111 had previously received the non-blocking acknowledgement from DMA engine 114 at action 342, the AP 111 may transition to a next WFI state 352 and await a wakeup interruption and next data segment read at action 354 from DMA engine 114 (shown in FIG. 3 illustration as action 342B). After action 354, the AP 111 again transitions out of WFI state and into an active processing state. The sequence returns to action 336 and continues to loop through actions 336-354 (loop designated in FIG. 3 as 357), authenticating data segments of the image, until an iteration of action 348 is associated with a successful authentication of a last data segment of the image.

Once a last data segment of the image has been successfully authenticated at an iteration of action 348, the entire image has been read and authenticated and the AP 111 takes action 360 and brings subsystem 207 out of reset. Advantageously, throughout the boot sequence 300, the AP 111 periodically transitioned in and out of a WFI idle state, thereby avoiding unnecessary power consumption while the DMA engine 114 and/or the crypto engine 116 processed workloads.

Figure 4:
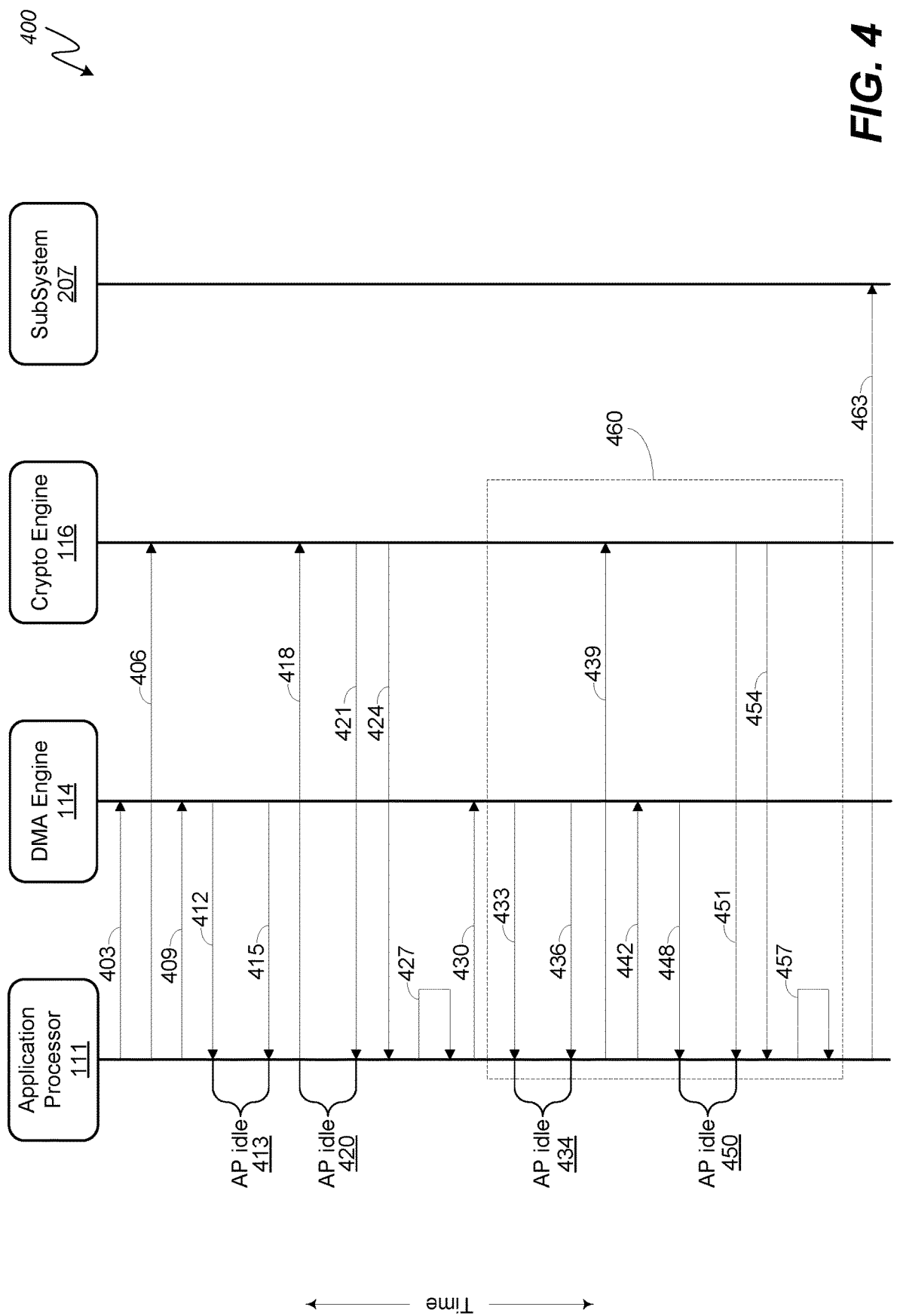
FIG. 4 is a sequence diagram illustrating another exemplary embodiment of a method for modem-directed application processor boot flow according to the solution.

FIG. 4 is a sequence diagram illustrating another exemplary embodiment of a method 400 for modem-directed application processor boot flow according to the solution. The exemplary embodiment illustrated by the FIG. 4 sequence 400 includes additional idle state opportunities for the AP 111 over the sequence 300.

Beginning at action 403, the AP 111, in response to a power on reset communication from the modem 101, initializes DMA engine 114 and, at action 406, initializes crypto engine 116. As would be understood by one of ordinary skill in the art, actions 403, 406 may occur essentially simultaneously, one after the other, in either order. That is, action 403 may immediately precede action 406 or, in the alternative, action 406 may immediately precede action 403.

With DMA engine 114 and crypto engine 116 initialized, the AP 111 may take action 409 and trigger DMA engine 114 to read metadata associated with a particular image stored in Flash 112A. In response, the DMA engine 114 may take action 412 and return a non-blocking acknowledgement to AP 111. Advantageously, the AP 111 may enter a first WFI state 413 to conserve power consumption as the DMA engine 114 reads the metadata. The AP 111 may remain in the first WFI state 413 until at action 415 it receives a wakeup interrupt from DMA engine 114.

In response to the wakeup interrupt 415, the AP 111 may transition out of the WFI state and back to an active processing state to take action 418 and instruct crypto engine 116 to calculate a hash associated with the metadata. The AP 111 may transition back to the WFI state for a second duration 420 while the crypto engine 116 calculates the hash. The crypto engine 116 may calculate the hash and send a wakeup interrupt (action 421) to AP 111 before returning the hash to AP 111 via action 424. The AP 111 may then validate the hash and signature associated with the metadata (action 427) and then initiate DMA engine 114 to read a first segment of data from the image (action 430). Next, DMA engine 114 may respond with action 433 acknowledging the AP 111 request, similar to previously described action 412. Advantageously, the AP 111 may enter a third WFI state 434 to conserve power consumption as the DMA engine 114 reads the first segment of the image. The AP 111 may remain in the WFI state 434 until at action 436 it receives a wakeup interrupt from DMA engine 114.

In response to the wakeup interrupt 436, the AP 111 may transition out of the WFI state and back to an active processing state to take action 439 and instruct crypto engine 116 to calculate the hash for the first data segment of the image. Then, the AP 111 may take action 442 and initiate the DMA engine 114 to begin its read of a next data segment of the image. The DMA engine 114 may respond with action 448 acknowledging the request to read the next data segment. The AP 111 may then enter a next idle state 450 while the DMA engine 114 works to read the next data segment and the crypto engine 116 calculates the hash according to previous action 439. The AP 111 may remain in idle state 450 until it receives a wakeup interrupt from either of DMA engine 114 or crypto engine 116. In the FIG. 4 illustration, the AP 111 transitions out of WFI state 450 and back to an active processing state when it receives a wakeup interrupt from crypto engine 116 (action 451). Crypto engine 116 provides the hash requested at previous action 439 via action 454, similar to previous action 424. The AP 111 may then validate the hash and signature associated with the first segment of the image (action 457).

Next, the sequence 400 essentially returns to WFI state 434 as the AP 111 transitions back into a WFI state and awaits a wakeup interruption and the next data segment read from DMA engine 114. The sequence 400 continues to loop through actions 433-457 (loop designated in FIG. 4 as 460), authenticating data segments of the image, until an iteration of action 457 is associated with a successful authentication of a last data segment of the image.

Once a last data segment of the image has been successfully authenticated at an iteration of action 457, the entire image has been read and authenticated and the AP 111 takes action 463 and brings subsystem 207 out of reset. Advantageously, throughout the boot sequence 400, the AP 111 periodically transitioned in and out of a WFI idle state, thereby avoiding unnecessary power consumption while the DMA engine 114 and/or the crypto engine 116 processed workloads.

Figure 5:
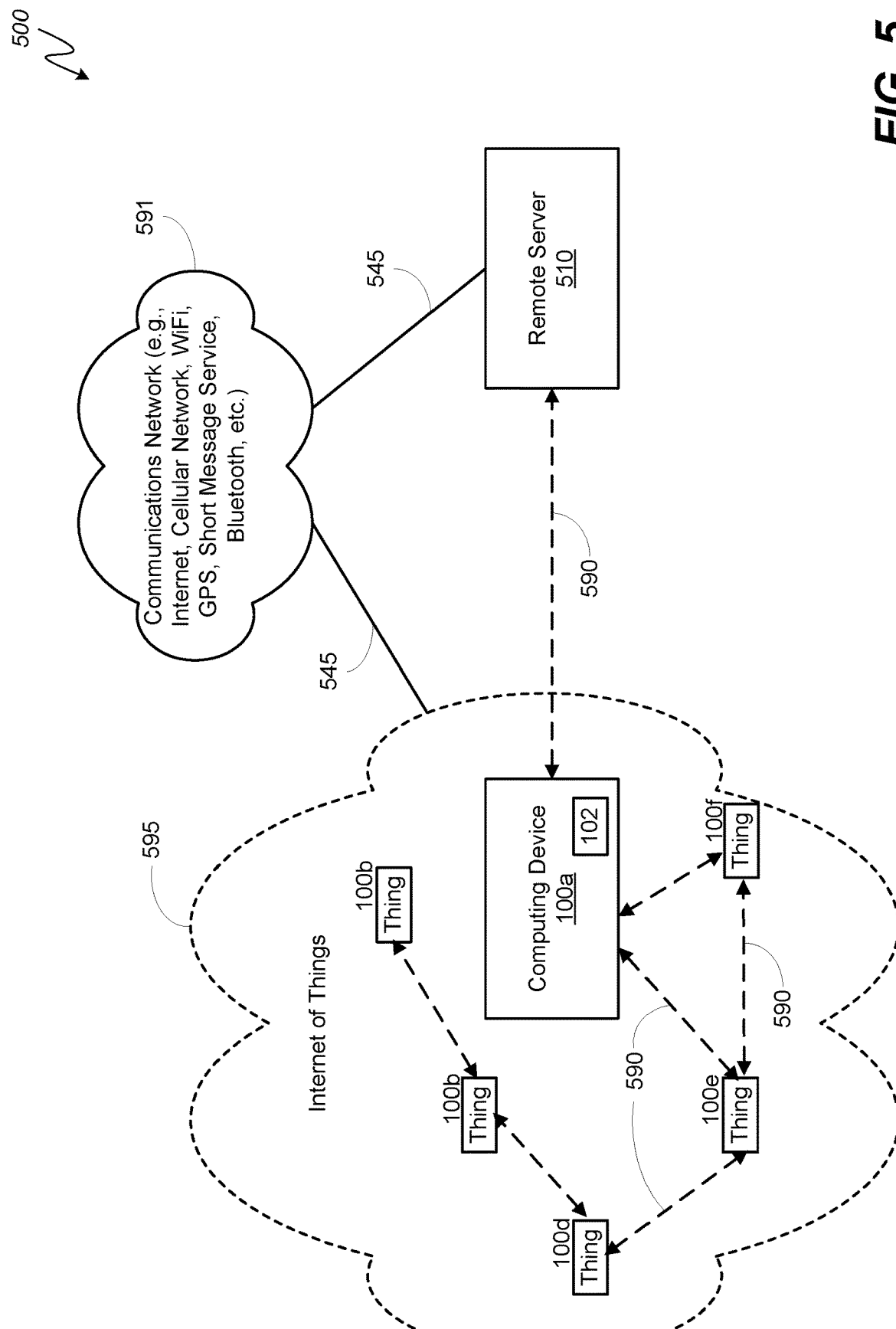
FIG. 5 is a high level functional block diagram illustrating an exemplary architecture of a system for advantageously leveraging a device configured for a modem-directed application processor boot flow.

FIG. 5 is a high level functional block diagram illustrating an exemplary architecture of a system 500 for advantageously leveraging a device 100a configured for a modem-directed application processor boot flow. Referring to the FIG. 5 illustration, the exemplary embodiments of a portable computing device 100a with SoC 102 that may leverage a modem-directed application processor boot flow and may include remote wireless communication, real-time software updates, extended data storage, etc. and may be provided with various configurations.

Advantageously, embodiments of devices 100a-f configured for communication via a computer system such as the exemplary system 500 depicted in FIG. 5 may reside within the "Internet of Things" 595 and, as such, leverage communications networks 591 including, but not limited to cellular networks, public switched telephone networks (PSTNs), cable networks, WiFi™ brand IEEE 802.11x wireless networks, and the Internet for, among other things, software upgrades, content updates, database queries, data transmission, etc. Other data that may be used in connection with a PCD 100 and accessible via the Internet or other networked system will occur to one of ordinary skill in the art.

The illustrated computer system 500 may comprise a remote server 510 that may be coupled to the communication network 591. The communication network 591 may also comprise any or all of a wide area network ("WAN"), a local area network ("LAN"), the Internet, or a combination of other types of networks. It will be understood that the term server 510 may refer to a single server system or multiple systems or multiple servers. The server 510 may be coupled to a database (not shown) configured to store various records related to, but not limited to, historical data, filters/rules algorithms, user preferences, previously calculated data/uploads, trends, etc.

When the server 510 is coupled to the network 591, the server 510 may communicate through the network 591 with various different devices 100a-f that comprise the "Internet of Things" including exemplary device 100a. Device 100a may run or execute web browsing software or functionality to access and/or communicate with and/or "listen for" the server 510. Any device 100b-f that may access the network 591 either directly or via a tether to a complimentary device, may be a device 100 according to the computer system 500.

The device 100a, as well as other components within system 500 such as, but not limited to, a wireless router (not shown), may be coupled to the network 591 by various types of communication links 545. These communication links 545 may comprise wired as well as wireless links. The communication links 545 allow a devices 100a-f to establish virtual links 590 with the server 510 and/or each other. While a virtual link 590, for example, is depicted between the server 510 and the device 100a, an actual wired or wireless link 545 may exist between the server 510 and the device 100a, which may also function as a "hub device," as understood by one of ordinary skill in the art.

The link 545 may be used only to relay data to the server 510 from the hub device 100a, depending on embodiment, as a uni-directional communications channel. In other exemplary embodiments, the server 510 and/or hub device 100a may establish bi-directional communications over network 591 as understood by one of ordinary skill in the art.

As a non-limiting application scenario for an embodiment of the solution, device 100a within computer system 500 may comprise a utility meter (i.e. gas meter, water meter, electric meter, etc.) associated with a residential household and/or a business. The utility meter 100a may experience long durations of minimal processing activity in which data is being collected by the meter 100a, but the applications processor (AP) 111 of Soc 102 (see FIG. 2) is in a sleep state or otherwise powered down, as previously described. The modem 101 within SoC 102, however, may be continually powered and configured to constantly "listen for" or monitor for instructions/requests originating from the server 510.

The instructions/requests from server 510 may include, for example, but are not limited to, commands for the utility meter 100a to upload collected data from its sensors (not illustrated). Consistent with what has been previously described above, the modem 101 (see FIG. 2) of the SoC 102 may respond by directing the AP 111 to boot-up (i.e. "turn-on") for the purpose of executing certain instructions. According to the solution, the AP 111 (see FIG. 2) may execute its boot via leveraging other components within SoC 102 as previously described.

In this way, exemplary embodiments of the solution leveraged by devices 100a-f residing within the Internet of Things 595 may advantageously keep a higher power consuming (a.k.a "power-hungry") AP 111 in a powered down state when not needed. The modem 101 may then be used to "wake" the AP 111 (as well as its associated memory components) when the processing capacity of the AP 111 is needed. Moreover, the AP 111 may realize further power savings during its boot sequence by using other, less power consuming components on the SoC 102 to distribute the boot workload, as previously described.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise random-access memory ("RAM"), read-only memory ("ROM"), EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for a modem-directed application processor boot sequence in a portable computing device ("PCD"), the method comprising:
   initializing a direct memory access ("DMA") engine for the boot sequence, wherein the DMA engine is configured to read data from a memory component;
   initializing a crypto engine for the boot sequence, wherein the crypto engine is configured to calculate a hash according to a predetermined hash function;
   reading with the DMA engine metadata and data segments associated with an image stored in the memory component and associated with the boot sequence;
   calculating with the crypto engine hash values associated with the metadata and data segments; and
   transitioning an application processor into an idle state for durations of time coinciding with at least one of reading with the DMA engine during the boot sequence and calculating with the crypto engine during the boot sequence.

2. The method of claim 1, wherein the memory component is a non-volatile flash memory component.

3. The method of claim 1, wherein the application processor is a heterogeneous, multi-core processor.

4. The method of claim 1, wherein the idle state is a wait-for-interrupt ("WFI") idle state.

5. The method of claim 1, wherein the PCD comprises at least one of a cellular telephone, a satellite telephone, a personal digital assistant ("PDA"), a smartphone, a navigation device, a tablet, a smartbook, a media player and a laptop computer.

6. A method for a modem-directed application processor boot flow in a portable computing device ("PCD"), the method comprising:
   a. initializing a direct memory access ("DMA") engine, wherein the DMA engine is configured to read data from a memory component;
   b. initializing a crypto engine, wherein the crypto engine is configured to calculate a hash according to a predetermined hash function;
   c. reading with the DMA engine metadata associated with an image stored in the memory component;
   d. transitioning an application processor from an active processing state into an idle state;
   e. calculating with the crypto engine a hash value associated with the metadata;
   f. authenticating the metadata by validating the hash value and a signature associated with the metadata;
   g. reading with the DMA engine a current segment of the image;
   h. transitioning the application processor from an active processing state to an idle state;
   i. calculating with the crypto engine a hash value associated with the current segment of the image;
   j. reading with the DMA engine a next segment of the image;
   k. authenticating the current segment of the image by validating the hash value and a signature associated with the current segment of the image;

l. transitioning the application processor from an active processing state to an idle state;
m. receiving with the application processor the next segment of the image from the DMA engine;
n. calculating with the crypto engine a hash value associated with the next segment of the image; and
o. repeating actions j through n until a last segment of the image is authenticated and then bringing a subsystem out of reset.

7. The method of claim 6, wherein the memory component is a non-volatile flash memory component.

8. The method of claim 6, wherein the application processor is a heterogeneous, multi-core processor.

9. The method of claim 6, wherein the idle state is a wait-for-interrupt ("WFI") idle state.

10. The method of claim 6, wherein the PCD comprises at least one of a cellular telephone, a satellite telephone, a personal digital assistant ("PDA"), a smartphone, a navigation device, a tablet, a smartbook, a media player and a laptop computer.

11. A computer system for modem-directed application processor boot sequence in a portable computing device ("PCD"), the system comprising:
an application processor configured to:
initialize a direct memory access ("DMA") engine for the boot sequence, wherein the DMA engine is configured to read data from a memory component;
initialize a crypto engine for the boot sequence, wherein the crypto engine is configured to calculate a hash according to a predetermined hash function;
instruct the DMA engine to read metadata and data segments associated with an image stored in the memory component and associated with the boot sequence;
instruct the crypto engine to calculate hash values associated with the metadata and data segments; and
transition into an idle state for durations of time coinciding with at least one of reading by the DMA engine and calculating by the crypto engine.

12. The system of claim 11, wherein the memory component is a non-volatile flash memory component.

13. The system of claim 11, wherein the application processor is a heterogeneous, multi-core processor.

14. The system of claim 11, wherein the idle state is a wait-for-interrupt ("WFI") idle state.

15. The system of claim 11, wherein the PCD comprises at least one of a cellular telephone, a satellite telephone, a personal digital assistant ("PDA"), a smartphone, a navigation device, a tablet, a smartbook, a media player and a laptop computer.

16. A computer system for modem-directed application processor boot flow in a portable computing device ("PCD"), the system comprising:
an application processor configured to:
a. initialize a direct memory access ("DMA") engine, wherein the DMA engine is configured to read data from a memory component;
b. initialize a crypto engine, wherein the crypto engine is configured to calculate a hash according to a predetermined hash function;
c. instruct the DMA engine to read metadata associated with an image stored in the memory component;
d. transition an application processor from an active processing state into an idle state;
e. instruct the crypto engine to calculate a hash value associated with the metadata;
f. authenticate the metadata by validating the hash value and a signature associated with the metadata;
g. instruct the DMA engine to read a current segment of the image;
h. transition the application processor from an active processing state to an idle state;
i. instruct the crypto engine to calculate a hash value associated with the current segment of the image;
j. instruct the DMA engine to read a next segment of the image;
k. authenticate the current segment of the image by validating the hash value and a signature associated with the current segment of the image;
l. transition from an active processing state to an idle state;
m. receive the next segment of the image from the DMA engine;
n. instructing the crypto engine to calculate a hash value associated with the next segment of the image; and
o. repeat actions j through n until a last segment of the image is authenticated and then bring a subsystem out of reset.

17. The system of claim 16, wherein the memory component is a non-volatile flash memory component.

18. The system of claim 16, wherein the application processor is a heterogeneous, multi-core processor.

19. The system of claim 16, wherein the idle state is a wait-for-interrupt ("WFI") idle state.

20. The system of claim 16, wherein the PCD comprises at least one of a cellular telephone, a satellite telephone, a personal digital assistant ("PDA"), a smartphone, a navigation device, a tablet, a smartbook, a media player and a laptop computer.

21. A computer system for a modem-directed application processor boot sequence in a portable computing device ("PCD"), the system comprising:
means for initializing a direct memory access ("DMA") engine for the boot sequence, wherein the DMA engine is configured to read data from a memory component;
means for initializing a crypto engine for the boot sequence, wherein the crypto engine is configured to calculate a hash according to a predetermined hash function;
means for instructing the DMA engine to read metadata and data segments associated with an image stored in the memory component and associated with the boot sequence;
means for instructing the crypto engine to calculate hash values associated with the metadata and data segments; and
means for transitioning an application processor into an idle state for durations of time coinciding with at least one of reading by the DMA engine the metadata and calculating by the crypto engine during the boot sequence.

22. The computer system of claim 21, wherein the memory component is a non-volatile flash memory component.

23. The computer system of claim 21, wherein the application processor is a heterogeneous, multi-core processor.

24. The computer system of claim 21, wherein the idle state is a wait-for-interrupt ("WFI") idle state.

25. The computer system of claim 21, wherein the PCD comprises at least one of a cellular telephone, a satellite telephone, a personal digital assistant ("PDA"), a smartphone, a navigation device, a tablet, a smartbook, a media player and a laptop computer.

26. A computer system for a modem-directed application processor boot flow in a portable computing device ("PCD"), the method comprising:
- a. means for initializing a direct memory access ("DMA") engine, wherein the DMA engine is configured to read data from a memory component;
- b. means for initializing a crypto engine, wherein the crypto engine is configured to calculate a hash according to a predetermined hash function;
- c. means for instructing the DMA engine to read metadata associated with an image stored in the memory component;
- d. means for transitioning an application processor from an active processing state into an idle state;
- e. means for instructing the crypto engine to calculate a hash value associated with the metadata;
- f. means for authenticating the metadata by validating the hash value and a signature associated with the metadata;
- g. means for instructing the DMA engine to read a current segment of the image;
- h. means for transitioning the application processor from an active processing state to an idle state;
- i. means for instructing the crypto engine to calculate a hash value associated with the current segment of the image;
- j. means for instructing the DMA engine to read a next segment of the image;
- k. means for authenticating the current segment of the image by validating the hash value and a signature associated with the current segment of the image;
- l. means for transitioning the application processor from an active processing state to an idle state;
- m. means for receiving the next segment of the image from the DMA engine;
- n. means for instructing the crypto engine to calculate a hash value associated with the next segment of the image; and
- o. means for repeating actions j through n until a last segment of the image is authenticated and then bringing a subsystem out of reset.

27. The computer system of claim 26, wherein the memory component is a non-volatile flash memory component.

28. The computer system of claim 26, wherein the application processor is a heterogeneous, multi-core processor.

29. The computer system of claim 26, wherein the idle state is a wait-for-interrupt ("WFI") idle state.

30. The computer system of claim 26, wherein the PCD comprises at least one of a cellular telephone, a satellite telephone, a personal digital assistant ("PDA"), a smartphone, a navigation device, a tablet, a smartbook, a media player and a laptop computer.

31. A computer program product comprising a non-transitory computer usable medium having a computer readable program code embodied therein, said computer readable program code adapted to be executed to implement a method for a modem-directed application processor boot sequence in a portable computing device ("PCD"), said method comprising:

initializing a direct memory access ("DMA") engine for the boot sequence, wherein the DMA engine is configured to read data from a memory component;

initializing a crypto engine for the boot sequence, wherein the crypto engine is configured to calculate a hash according to a predetermined hash function;

reading with the DMA engine metadata and data segments associated with an image stored in the memory component and associated with the boot sequence;

calculating with the crypto engine hash values associated with the metadata and data segments; and transitioning an application processor into an idle state for durations of time coinciding with at least one of reading with the DMA engine during the boot sequence and calculating with the crypto engine during the boot sequence.

32. The computer program product of claim 31, wherein the memory component is a non-volatile flash memory component.

33. The computer program product of claim 31, wherein the application processor is a heterogeneous, multi-core processor.

34. The computer program product of claim 31, wherein the idle state is a wait-for-interrupt ("WFI") idle state.

35. The computer program product of claim 31, wherein the PCD comprises at least one of a cellular telephone, a satellite telephone, a personal digital assistant ("PDA"), a smartphone, a navigation device, a tablet, a smartbook, a media player and a laptop computer.

36. A computer program product comprising a non-transitory computer usable medium having a computer readable program code embodied therein, said computer readable program code adapted to be executed to implement a method for a modem-directed application processor boot flow in a portable computing device ("PCD"), said method comprising:
- a. initializing a direct memory access ("DMA") engine, wherein the DMA engine is configured to read data from a memory component;
- b. initializing a crypto engine, wherein the crypto engine is configured to calculate a hash according to a predetermined hash function;
- c. reading with the DMA engine metadata associated with an image stored in the memory component;
- d. transitioning an application processor from an active processing state into an idle state;
- e. calculating with the crypto engine a hash value associated with the metadata;
- f. authenticating the metadata by validating the hash value and a signature associated with the metadata;
- g. reading with the DMA engine a current segment of the image;
- h. transitioning the application processor from an active processing state to an idle state;
- i. calculating with the crypto engine a hash value associated with the current segment of the image;
- j. reading with the DMA engine a next segment of the image;
- k. authenticating the current segment of the image by validating the hash value and a signature associated with the current segment of the image;
- l. transitioning the application processor from an active processing state to an idle state;
- m. receiving with the application processor the next segment of the image from the DMA engine;
- n. calculating with the crypto engine a hash value associated with the next segment of the image; and
- o. repeating actions j through n until a last segment of the image is authenticated and then bringing a subsystem out of reset.

37. The computer program product of claim 36, wherein the memory component is a non-volatile flash memory component.

38. The computer program product of claim 36, wherein the application processor is a heterogeneous, multi-core processor.

39. The computer program product of claim 36, wherein the idle state is a wait-for-interrupt ("WFI") idle state.

40. The computer program product of claim 36, wherein the PCD comprises at least one of a cellular telephone, a satellite telephone, a personal digital assistant ("PDA"), a smartphone, a navigation device, a tablet, a smartbook, a media player and a laptop computer.

41. A method for a modem-directed application processor boot sequence in a portable computing device ("PCD") and in remote communication with a server, the method comprising:
   forming a network of one or more Internet of Things (IoT) devices, the PCD being one of the IoT devices;
   a modem of the PCD receiving an instruction from the remote server;
   the modem sending a wakeup signal to an application processor to execute a boot sequence;
   the application processor initializing a direct memory access ("DMA") engine for the boot sequence, wherein the DMA engine is configured to read data from a memory component;
   the application processor initializing a crypto engine for the boot sequence, wherein the crypto engine is configured to calculate a hash according to a predetermined hash function;
   the DMA engine reading metadata and data segments associated with an image stored in the memory component and associated with the boot sequence;
   the crypto engine calculating hash values associated with the metadata and data segments; and
   the application processor transitioning into an idle state for durations of time coinciding with at least one of reading with the DMA engine during the boot sequence and calculating with the crypto engine during the boot sequence.

42. The method of claim 41, wherein the memory component is a non-volatile flash memory component.

43. The method of claim 41, wherein the application processor is a heterogeneous, multi-core processor.

44. The method of claim 41, wherein the idle state is a wait-for-interrupt ("WFI") idle state.

45. A computer system for modem-directed application processor boot sequence in a portable computing device ("PCD"), the system comprising:
   a remote server in communication with one or more Internet of Things (IoT) devices;
   the PCD comprising one of the IoT devices and having a modem configured to receive instructions from the remote server and, in response to the instructions, cause an application processor within the PCD to execute a boot sequence, the application processor configured to:
      initialize a direct memory access ("DMA") engine for the boot sequence, wherein the DMA engine is configured to read data from a memory component;
      initialize a crypto engine for the boot sequence, wherein the crypto engine is configured to calculate a hash according to a predetermined hash function;
      instruct the DMA engine to read metadata and data segments associated with an image stored in the memory component and associated with the boot sequence;
      instruct the crypto engine to calculate hash values associated with the metadata and data segments; and
      transition into an idle state for durations of time coinciding with at least one of reading by the DMA engine and calculating by the crypto engine.

46. The system of claim 45, wherein the memory component is a non-volatile flash memory component.

47. The system of claim 45, wherein the application processor is a heterogeneous, multi-core processor.

48. The system of claim 45, wherein the idle state is a wait-for-interrupt ("WFI") idle state.

* * * * *